United States Patent [19]

Karanastassis

[11] 4,264,384
[45] Apr. 28, 1981

[54] METHOD AND ARTICLE FOR ELECTRICALLY SPLICING WEB ENDS

[75] Inventor: Evangelos Karanastassis, Osterode, Fed. Rep. of Germany

[73] Assignee: Polychrome Corporation, Yonkers, N.Y.

[21] Appl. No.: 83,089

[22] Filed: Oct. 9, 1979

[51] Int. Cl.³ .................................................. H01R 43/00
[52] U.S. Cl. ........................................ 156/49; 113/119; 156/157; 174/84 R; 174/117 FF; 174/117 A; 339/17 F; 428/58; 428/78; 428/192; 428/344
[58] Field of Search ............... 156/49, 69, 94, 157, 156/108, 291; 428/57, 58, 63, 66, 81, 192, 189, 191, 209, 344, 78; 113/119; 339/17 F; 174/84 R, 117 R, 117 A, 117 F, 117 FF

[56] References Cited

U.S. PATENT DOCUMENTS

| | | | |
|---|---|---|---|
| 3,239,916 | 3/1966 | Love | 339/17 F |
| 3,311,696 | 3/1967 | Melnick | 174/117 R |
| 3,355,545 | 11/1967 | Kilduff et al. | 174/117 R |
| 3,419,669 | 12/1968 | Dienes | 174/76 |
| 3,708,609 | 1/1973 | Iosue et al. | 174/117 FF |
| 3,763,307 | 10/1973 | Wolf | 339/17 F |
| 3,850,718 | 11/1974 | Trapani | 156/94 |
| 3,868,293 | 2/1975 | Selph | 428/63 |
| 4,067,105 | 1/1978 | Zahn et al. | 174/117 A |
| 4,085,502 | 4/1978 | Ostman et al. | 174/117 FF |
| 48-23353 | 9/1978 | Brandwein | 428/344 |
| 50-81634 | 1/1979 | Hoffmann | 156/94 |

FOREIGN PATENT DOCUMENTS

| | | | |
|---|---|---|---|
| 753592 | 1/1971 | Belgium | 156/157 |
| 4823353 | 2/1970 | Japan | 156/157 |
| 5081634 | 1/1977 | Japan | 156/157 |

OTHER PUBLICATIONS

Damm et al. "Adhesive . . . Closures" IBM Technical Disclosure Bulletin, vol. 14, No. 2 (7/71), p. 474.

Primary Examiner—Jerome W. Massie

[57] ABSTRACT

Provided is a method and apparatus for maintaining electrical conductivity between the ends of spliced metallic webs during surface treatment operations.

3 Claims, 3 Drawing Figures

METHOD AND ARTICLE FOR ELECTRICALLY SPLICING WEB ENDS

BACKGROUND OF THE INVENTION

In the manufacture of many articles of commerce, for example lithographic printing plates, one is required to provide various surface treatments to metallic webs. Some such treatments require an electrical contact between the metallic web and a process material such as an electrolyte. One particularly useful web processing process is anodizing. In anodizing a metallic material, such as aluminum, a long web of the metal is continuously passed through an electrolytic solution, typically sulfuric acid, during which time an electric current is passed from an electrode immersed in the solution to the aluminum web. In the past a problem has been encountered when one supply spool of untreated metallic web has been exhausted and another must be begun. Merely allowing the end of the spent spool to pass through the processing system and threading the new spool through is impracticable due to a lack of web tension throughout the entire process system and an enormous waste of material. In the past several methods of splicing the end of the first web to the beginning of the new web have been most troublesome. In one method, the ends are merely sealed together by means of an adhesive. This has been proven to be unsatisfactory since electrical contact is not maintained between the spliced webs and there is a tendency for an arc to develop or burning to occur in the gap between the ends when the spliced portion enters the electrolytic solutions. By another method, the ends of the web are actually welded together at a joint. However, this requires the stopping of the manufacturing process to effect the weld with a concomitant loss in manufacturing time and material waste due to excess dwell time in downstream treatment steps.

SUMMARY OF THE INVENTION

These problems have been overcome by the use of a splicing article which is partially adhesive and partially electrically conductive. Such an article, when pressed between the web ends effectively adheres said ends and maintains sufficient electrical connection between the webs so as to prevent burning, arcing and substantial interruption in the web processing. Such an article comprises an elongated strip of relatively thin, electrically conductive material having a band of double faced adhesive tape around its perimeter which is partially adherent to said perimeter and partially overhangs the perimeter. Such adhesive tape typically comprises a thin, flexible substrate with a pressure-sensitive adhesive material on its two broadest sides. Said electrically conductive material is a strip of aluminum foil. When said article is quickly pressed between the web ends to be spliced, the foil provides an electrical contact between the webs and the tape adheres the ends, thus providing an effective splice with almost no change in process dwell time.

It is, therefore, an object of the present invention to provide a method and apparatus for electrically and adherently connecting the ends of two electrically conductive webs.

It is a further object of the present invention to provide a method and apparatus for electrically and adherently connecting conductive web ends without substantially interrupting downstream process steps.

These and other objects of the present invention will be in part discussed and in part apparent upon a consideration of the detailed description of the preferred embodiment as hereinafter provided.

DETAILED DESCRIPTION OF THE PREFERRED EMBODIMENT

As hereinbefore mentioned, the present invention provides an article and method for electrically and adherently connecting the ends of two metallic webs. Importantly, conductivity and adhesion must be maintainable between said webs while under tension and traversing through caustic electrolytic treatments.

Figure 1:
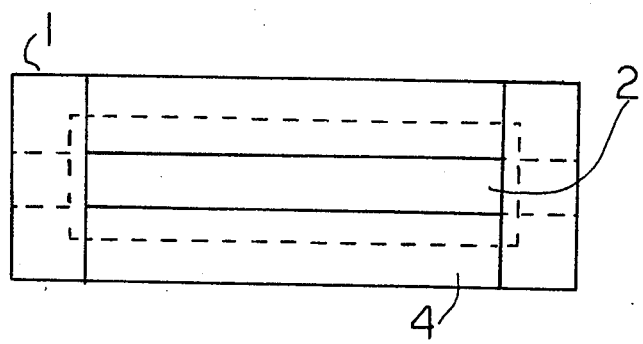
FIG. 1 is a plan view of the article of the present invention.

FIG. 1 shows the article of manufacture, 1, capable of providing electrical conductivity and adhesion between the ends of two webs. It is shown to comprise an elongated strip of metallic foil, 2, which preferably is made of aluminum. This metallic strip is surrounded at its perimeter by portions of an adhesive tape-like material, 4, which has an adhesive material on both faces thereof. This tape partially adheres to the metal strip and partially overhangs its edges along its entire perimeter. In order to achieve a connection between two metallic webs, this article is quickly pressed between the two web ends sought to be attached.

Figure 2:
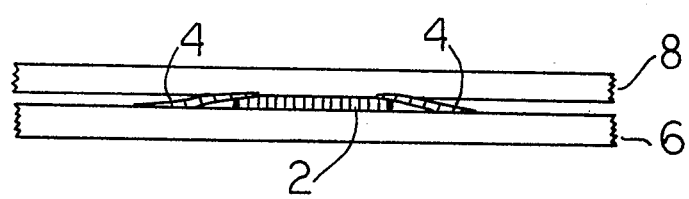
FIG. 2 is a partial cross-sectional view of the article set between two web ends.

FIG. 2 shows the resultant splice section when two web ends 6 and 8 are pressed together with the article 1 between them. Adhesive portions 4 provide an effective adhesion between the webs and is capable of withstanding the web tension which tends to shear the splice apart. Since the tape is relatively thin and somewhat compressible, it does not interfere with the effective electrical connection provided between the webs by metallic strip 2.

Figure 3:
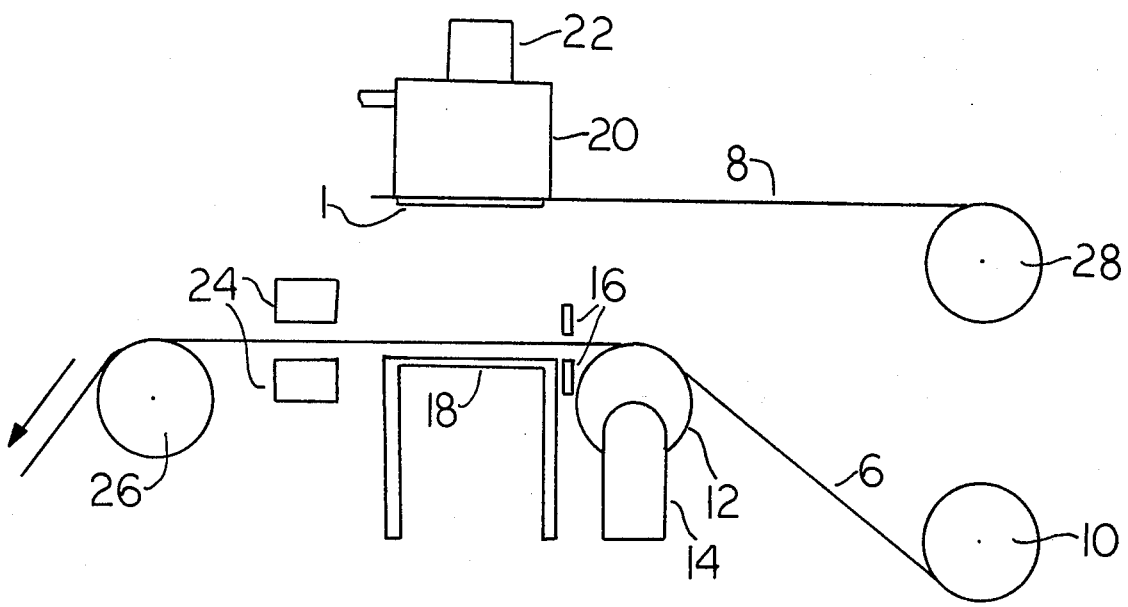
FIG. 3 is a schematic drawing of an apparatus useful for splicing two web ends in an in-line production sequence.

FIG. 3 shows an apparatus which may be employed to set the article in place between the webs. Web 6 is unravelled from spool 10 and passes over guide roller means 12. Guide roller 12 is mounted for vertical displacement by displacing means 14 which may be a piston type bearing. The apparatus further comprises web cutting means 16, a horizontal table support 18, a vacuum plate 20 mounted on vertical displacement means 22, optional clamping means 24 and guide means 26.

In operation, web 6 is unravelled from spool 10, passes over guide means 12, through the cutter 16, over the table 18, through the clamping means 24 and is guided by means 26 toward the processing treatments which are to follow. New web 8 which is stored on spool 28, has its free end held by a vacuum by plate 20. Article 1 is now adhered on the underside of web 8 as shown. When the end of web 6 is reached, clamping means 24 engage and hold the web, bearing 14 causes guide means 12 to descend thereby causing web 6 to contact the upper surface of table 18. Displacement means 22 then presses the vacuum frame 20 down thus pressing the article 1 forcibly between webs 6 and 8, causing the necessary connection. Cutting means 16 then trims off the excess end of web 6, the vacuum from plate 20 is released, displacement means 22 cause the plate 20 to ascend, clamp 24 is disengaged and guide means 12 is raised to provide table clearance. The process then continues by a feed from web 8. The procedure is repeated as necessary when spool 28 is used up.

To assure excellent results, the adhesive tapes should form a watertight seal around the metallic strip. Also, the adhesive tape material should be selected such that it will not be substantially adversely affected by the treatments through which the web splice must pass.

EXAMPLE

A strip of lithographic grade aluminum foil 100 cm long by 10 cm wide was applied with a ribbon of double faced Testa-Fix 959 adhesive tape completely around its perimeter. The tape was 5 cm wide with approximately one quarter of the tape width adhered to the foil and the balance overhanging from the foil. The thusly constructed article was firmly pressed between the end portion of two aluminum webs. The spliced web portion was passed sequentially through a sodium hydroxide degreasing bath, a phosphoric acid anodizing treatment and a sodium silicate bath. Although these solutions had temperatures of up to 80° C. while the web was run at a speed of 15 meters per minute and a splice strain of $6 \times 10^3$ Newtons was observed, no appreciable adverse effects were noticed in the splice.

What is claimed is:

1. An article capable of electrically and adhesively connecting two metallic surfaces which comprises an elongate, continuous electrically conductive metal strip of predetermined length and a ribbon of adhesive tape adhered to said metallic strip; said tape having an adhesive composition on both sides thereof and being attached to said strip so as to completely encircle at least one face of said strip at its perimeter and partially protrude outwardly from each portion of the strip perimeter while providing at least a central portion of both sides of strip without adhesive tape, said tape furthermore being relatively thin and somewhat compressible whereby it would not interfere with the effective electrical connection provided between the two metallic surfaces by the electrically conductive metal strip.

2. The article of claim 1 wherein said metal strip is comprised of aluminum.

3. A method of electrically and adhesively connecting two metallic surfaces which comprises pressing the article of claim 1 or 2 between said two metallic surfaces so as to provide a watertight seal around said metal strip.

* * * * *